United States Patent
Wang (10) Patent No.: US 11,456,934 B2
(45) Date of Patent: Sep. 27, 2022

(54) METHOD, MANAGEMENT NODE AND PROCESSING NODE FOR CONTINUOUS AVAILABILITY IN CLOUD ENVIRONMENT

(71) Applicant: Nokia Shanghai Bell Co., Ltd., Shanghai (CN)

(72) Inventor: Bi Wang, Hangzhou (CN)

(73) Assignee: Nokia Shanghai Bell Co., Ltd, Shanghai (CN)

(*) Notice: Subject to any disclaimer, the term of this patent is extended or adjusted under 35 U.S.C. 154(b) by 173 days.

(21) Appl. No.: 16/762,123

(22) PCT Filed: Nov. 9, 2017

(86) PCT No.: PCT/CN2017/110127
§ 371 (c)(1),
(2) Date: May 6, 2020

(87) PCT Pub. No.: WO2019/090564
PCT Pub. Date: May 16, 2019

(65) Prior Publication Data
US 2020/0358678 A1 Nov. 12, 2020

(51) Int. Cl.
*G06F 15/173* (2006.01)
*H04L 43/065* (2022.01)
(Continued)

(52) U.S. Cl.
CPC ........ *H04L 43/065* (2013.01); *H04L 41/0803* (2013.01); *H04L 43/062* (2013.01); *H04L 47/726* (2013.01); *H04L 67/1036* (2013.01)

(58) Field of Classification Search
CPC . H04L 43/065; H04L 41/0803; H04L 43/062; H04L 47/726; H04L 67/1036
(Continued)

(56) References Cited

U.S. PATENT DOCUMENTS

| 7,870,439 B2 * | 1/2011 | Fujiyama | G06F 11/1482 714/11 |
| 9,396,039 B1 | 7/2016 | Arguelles et al. | |

(Continued)

FOREIGN PATENT DOCUMENTS

| CN | 103746855 A | 4/2014 |
| EP | 1333615 B1 | 5/2007 |
| WO | 2015/057237 A1 | 4/2015 |

OTHER PUBLICATIONS

Badonnel et al., "Dynamic Pull-based Load Balancing for Autonomic Servers", IEEE Network Operations and Management Symposium, Apr. 7-11, 2008, pp. 751-754.
(Continued)

*Primary Examiner* — Duyen M Doan
(74) *Attorney, Agent, or Firm* — Nokia Shanghai Bell Co., Ltd (57) ABSTRACT

Method, management node and processing node are disclosed for continuous availability in a cloud environment. According to an embodiment, the cloud environment comprises a plurality of layers and each layer includes at least two processing nodes. Each processing node in a layer can pull job(s) from the processing nodes in the upper layer if any and prepare job(s) for the processing nodes in the under layer if any. A method implemented at a management node comprises receiving measurement reports from the plurality of layers. The measurement report of each processing node comprises information about job(s) pulled from the upper layer if any and job(s) pulled by the under layer if any. The method further comprises determining information about failure in the cloud environment based on the measurement reports.

20 Claims, 7 Drawing Sheets

(51) Int. Cl.
*H04L 41/0803* (2022.01)
*H04L 43/062* (2022.01)
*H04L 47/726* (2022.01)
*H04L 67/1036* (2022.01)

(58) Field of Classification Search
USPC .................................................. 709/223–225
See application file for complete search history.

(56) References Cited

U.S. PATENT DOCUMENTS

| | | | |
|---|---|---|---|
| 9,525,727 B2 | 12/2016 | Stolyar et al. | |
| 9,973,569 B2 * | 5/2018 | Parashar | G06F 9/54 |
| 2003/0145249 A1 | 7/2003 | Wilson et al. | |
| 2005/0021594 A1 | 1/2005 | Bernardin et al. | |
| 2009/0210876 A1 | 8/2009 | Shen et al. | |
| 2011/0153824 A1 * | 6/2011 | Chikando | G06F 9/5088 |
| | | | 718/100 |
| 2013/0135997 A1 | 5/2013 | Lee | |
| 2013/0227355 A1 * | 8/2013 | Dake | G06F 11/0781 |
| | | | 714/48 |
| 2014/0019613 A1 * | 1/2014 | Ishikawa | G06F 11/3442 |
| | | | 709/224 |
| 2014/0258790 A1 | 9/2014 | Sorenson et al. | |
| 2014/0325524 A1 | 10/2014 | Zangaro et al. | |
| 2015/0317217 A1 | 11/2015 | Kurabayashi | |
| 2016/0188376 A1 | 6/2016 | Rosas et al. | |

OTHER PUBLICATIONS

International Search Report and Written Opinion received for corresponding Patent Cooperation Treaty Application No. PCT/CN2017/110127, dated Jul. 18, 2018, 10 pages.

Office action received for corresponding Chinese Patent Application No. 201780096620.1, dated Mar. 29, 2022, 6 pages of office action and no page of translation available.

* cited by examiner

METHOD, MANAGEMENT NODE AND PROCESSING NODE FOR CONTINUOUS AVAILABILITY IN CLOUD ENVIRONMENT

RELATED APPLICATION

This application claims priority to PCT Application No. PCT/CN2017/110127, filed on Nov. 9, 2017, of which is incorporated herein by reference in its entirety.

FIELD OF THE INVENTION

Embodiments of the disclosure generally relate to cloud processing, and, more particularly, to a method, a management node and a processing node for continuous availability.

BACKGROUND

For cloud based services, high availability (HA) is an important requirement because it is essential for the stable delivery of the services. Conventionally, heartbeat/watchdog is used as HA detection mechanism. Specifically, a periodic heartbeat signal may be generated by one node in a cloud environment to indicate normal operation to other node(s). If a destination node does not receive the heartbeat signal for some time such as a few heartbeat intervals, the source node that should have sent the heartbeat signal is assumed to have failed.

However, the conventional heartbeat/watchdog mechanism does not work well for cloud radio access network (CloudRAN). Therefore, it would be advantageous to provide an effective and efficient solution for HA in CloudRAN.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to the first aspect of the disclosure, it is provided a method implemented at a management node in a cloud environment. The cloud environment comprises a plurality of layers, and each layer includes at least two processing nodes. Each processing node in a layer can pull job(s) from the processing nodes in the upper layer if any and prepare job(s) for the processing nodes in the under layer if any. The method comprises receiving measurement reports from the plurality of layers. The measurement report of each processing node comprises information about job(s) pulled from the upper layer if any and job(s) pulled by the under layer if any. The method further comprises determining information about failure in the cloud environment based on the measurement reports.

In an embodiment of the disclosure, the information about job(s) pulled from the upper layer comprises at least identification information of the processing nodes from which the job(s) have been pulled. The information about job(s) pulled by the under layer comprises at least identification information of the processing nodes that have pulled the job(s).

In an embodiment of the disclosure, the plurality of layers comprises at least a first layer and its upper and under layers, and the first layer includes at least a first and a second processing nodes. Determining the information about failure comprises checking whether no measurement report has been received from the first processing node for a first predetermined period. Determining the information about failure further comprises checking whether the first processing node has pulled job(s) from the upper layer. Determining the information about failure further comprises checking whether the under layer has pulled job(s) from the first processing node. Determining the information about failure further comprises determining the information about failure based on the checking results.

In an embodiment of the disclosure, determining the information about failure comprises, when no measurement report has been received from the first processing node, the first processing node has pulled no jobs from the upper layer, and the under layer has pulled no jobs from the first processing node, determining that the first processing node fails. Determining the information about failure further comprises, when no measurement report has been received from the first processing node, the first processing node has pulled job(s) from the upper layer, and the under layer has pulled job(s) from the first processing node, determining that the connection between the first processing node and the management node breaks. Determining the information about failure further comprises, when a measurement report has been received from the first processing node, the first processing node has pulled no jobs from the upper layer, and the under layer has pulled no jobs from the first processing node, determining that the connection between the first processing node and the under layer breaks. Determining the information about failure further comprises, when a measurement report has been received from the first processing node, the first processing node has pulled job(s) from the upper layer, and only a third processing node in the under layer has pulled no jobs from the first processing node, determining that the connection between the first and third processing nodes breaks.

In an embodiment of the disclosure, the plurality of layers comprises at least a first layer and its under layer, and the first layer is the uppermost layer including at least a first and a second processing nodes. Determining the information about failure comprises checking whether no measurement report has been received from the first processing node for a first predetermined period. Determining the information about failure further comprises checking whether the under layer has pulled job(s) from the first processing node. Determining the information about failure further comprises determining the information about failure based on the checking results.

In an embodiment of the disclosure, determining the information about failure comprises, when no measurement report has been received from the first processing node, and the under layer has pulled no jobs from the first processing node, determining that the first processing node fails. Determining the information about failure further comprises, when no measurement report has been received from the first processing node, and the under layer has pulled job(s) from the first processing node, determining that the connection between the first processing node and the management node breaks. Determining the information about failure further comprises, when a measurement report has been received from the first processing node, and the under layer has pulled no jobs from the first processing node, determining that the connection between the first processing node and the under layer breaks. Determining the information about failure further comprises, when a measurement report has been received from the first processing node, and only a third processing node in the under layer has pulled no jobs from the first processing node, determining that the connection between the first and third processing nodes breaks.

In an embodiment of the disclosure, the plurality of layers comprises at least a first layer and its upper layer, and the first layer is the undermost layer including at least a first and a second processing nodes. Determining the information about failure comprises checking whether no measurement report has been received from the first processing node for a first predetermined period. Determining the information about failure further comprises checking whether the first processing node has pulled job(s) from the upper layer. Determining the information about failure further comprises determining the information about failure based on the checking results.

In an embodiment of the disclosure, determining the information about failure comprises, when no measurement report has been received from the first processing node, and the first processing node has pulled no jobs from the upper layer, determining that the first processing node fails. Determining the information about failure further comprises, when no measurement report has been received from the first processing node, and the first processing node has pulled job(s) from the upper layer, determining that the connection between the first processing node and the management node breaks. Determining the information about failure further comprises, when a measurement report has been received from the first processing node, and the first processing node has pulled no jobs from the upper layer, determining that the connection between the first processing node and the upper layer breaks. Determining the information about failure further comprises, when a measurement report has been received from the first processing node, and the first processing node has pulled no jobs from only a third processing node in the upper layer, determining that the connection between the first and third processing nodes breaks.

In an embodiment of the disclosure, the management node can be configured to act as a backup management node for another management node. The method further comprises checking whether the another management node has not synchronized with the backup management node for a second predetermined period. The method further comprises, in response to a positive checking result, initiating a vote about the alive/dead status of the another management node to the processing nodes in the plurality of layers. The method further comprises receiving vote data from the processing nodes in the plurality of layers. The method further comprises determining failure information related to the another management node based on the vote data.

In an embodiment of the disclosure, determining the failure information related to the another management node comprises, when all the processing nodes vote that the another management node is dead, determining that the another management node fails. Determining the failure information related to the another management node further comprises, when all the processing nodes vote that the another management node is alive, determining that the connection between the another management node and the backup management node breaks.

According to the second aspect of the disclosure, it is provided a method implemented at a processing node in a cloud environment. The cloud environment comprises a plurality of layers, and each layer includes at least two processing nodes. Each processing node in a layer can pull job(s) from the processing nodes in the upper layer if any and prepare job(s) for the processing nodes in the under layer if any. The method comprises sending a measurement report to a management node for failure detection. The measurement report comprises information about job(s) pulled from the upper layer if any and job(s) pulled by the under layer if any.

In an embodiment of the disclosure, the processing node has an in-queue for job(s) pulled from the upper layer if any, and an out-queue for job(s) to be pulled by the under layer if any. When the amount of job(s) in the in-queue is below a first predetermined threshold, the processing node can pull job(s) from the upper layer. When the amount of job(s) in the out-queue is below a second predetermined threshold, the processing node can prepare and put job(s) into the out-queue.

According to the third aspect of the disclosure, it is provided a management node for use in a cloud environment. The cloud environment comprises a plurality of layers, and each layer includes at least two processing nodes. Each processing node in a layer can pull job(s) from the processing nodes in the upper layer if any and prepare job(s) for the processing nodes in the under layer if any. The management node comprises at least one processor and at least one memory including computer-executable code. The at least one memory and the computer-executable code are configured to, with the at least one processor, cause the management node to perform the steps of any of the methods according to the first aspect described above.

According to the fourth aspect of the disclosure, it is provided a processing node for use in a cloud environment. The cloud environment comprises a plurality of layers, and each layer includes at least two processing nodes. Each processing node in a layer can pull job(s) from the processing nodes in the upper layer if any and prepare job(s) for the processing nodes in the under layer if any. The processing node comprises at least one processor and at least one memory including computer-executable code. The at least one memory and the computer-executable code are configured to, with the at least one processor, cause the processing node to perform the steps of any of the methods according to the second aspect described above.

According to the fifth aspect of the disclosure, it is provided a management node for use in a cloud environment. The cloud environment comprises a plurality of layers, and each layer includes at least two processing nodes. Each processing node in a layer can pull job(s) from the processing nodes in the upper layer if any and prepare job(s) for the processing nodes in the under layer if any. The management node comprises means configured to perform the steps of any of the methods according to the first aspect described above.

According to the sixth aspect of the disclosure, it is provided a processing node for use in a cloud environment. The cloud environment comprises a plurality of layers, and each layer includes at least two processing nodes. Each processing node in a layer can pull job(s) from the processing nodes in the upper layer if any and prepare job(s) for the processing nodes in the under layer if any. The processing node comprises means configured to perform the steps of any of the methods according to the second aspect described above.

According to the seventh aspect of the disclosure, it is provided a computer program product comprising computer-executable program instructions. The computer-executable program instructions are configured to, when being executed, cause an apparatus to operate according to any of the methods described above.

According to the eighth aspect of the disclosure, it is provided a computer readable storage medium having computer-executable program instructions stored therein. The computer-executable program instructions are configured to, when being executed, cause an apparatus to operate according to any of the methods described above.

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

To meet the demands of future cellular networks, CloudRAN has been proposed. It is a centralized, cloud computing-based architecture for radio access networks that supports 2G, 3G, 4G and future wireless communication standards. For example, a CloudRAN architecture may comprise a plurality of radio remote heads (RRHs), a virtual building baseband unit (BBU) pool, and a backhaul link connected therebetween. The virtual BBU pool may be implemented on top of a cloud computing platform.

As mentioned hereinbefore, high availability (HA) is an important requirement for cloud based services. However, the inventor of the present disclosure found that the conventional heartbeat/watchdog mechanism for HA detection does not work well for CloudRAN because of the reasons described below.

Firstly, the interval between data packets for user plane in CloudRAN is very small, usually at millisecond or even sub-millisecond level. If the heartbeat procedure is performed at the level of a second as it is done nowadays, thousands of packets may have been lost before the awareness of the failure. If the heartbeat procedure is performed at the level of a millisecond, the system load will increase a lot since many extra heartbeat packets have to be handled.

Secondly, the heartbeat detection usually cannot distinguish whether the failure is caused by working node failure or network failure. They both appear as no response being received, but the recovery strategies for them are different.

Thirdly, in load balance redundancy case, the load balancer conventionally employs dispatching mechanism. It cannot dispatch jobs precisely because the jobs are not all identical.

The present disclosure proposes a solution for HA in CloudRAN. Hereinafter, the solution will be described in detail with reference to FIGS. 1 to 8. Although the solution is proposed and described in the context of CloudRAN, those skilled in the art will understand that the principle of the present disclosure can also be applied to any other cloud environment.

Figure 1:
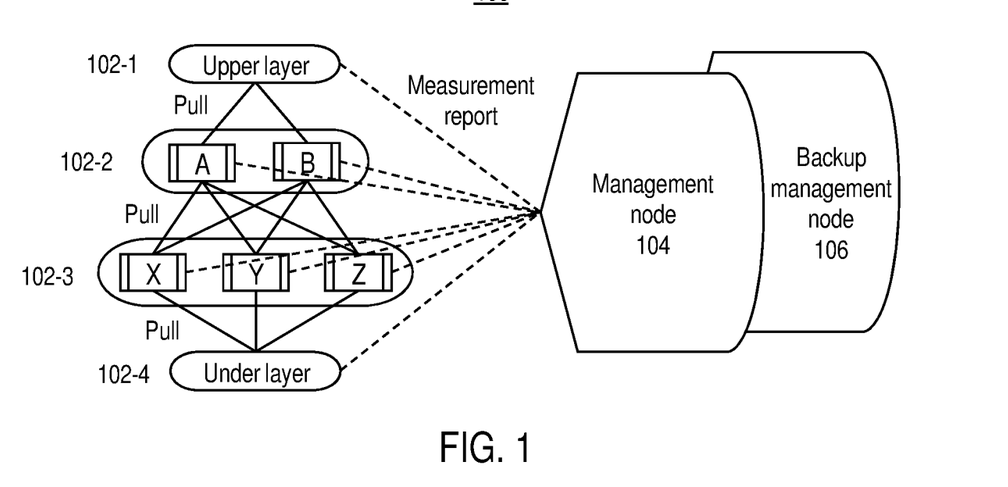
FIG. 1 shows an exemplary cloud environment according to an embodiment of the disclosure.

FIG. 1 shows an exemplary cloud environment according to an embodiment of the disclosure. As shown, the cloud environment 100 comprises a plurality of layers 102-1 to 102-4, a management node 104 and a backup management node 106. Although four layers are shown in FIG. 1, more or less layers may be employed as long as the number of layers is greater than or equal to 2.

Each of the plurality of layers 102-1 to 102-4 includes at least two processing nodes. For example, the layer 102-2 includes processing nodes A and B, while the layer 102-3 includes processing nodes X, Y and Z. The processing nodes in the same layer can process the same type of jobs. Different layers may process different types of jobs.

Each processing node in a layer can pull job(s) from the processing nodes in the upper layer if any and prepare job(s) for the processing nodes in the under layer if any. It should be noted that the terms "upper layer" and "under layer" mentioned here are defined relative to the discussed processing node. For example, any one of the processing nodes X, Y and Z in the layer 102-3 can pull job(s) from any one of the processing nodes A and B in the layer 102-2, and can prepare job(s) for the processing nodes in the layer 102-4. Thus, relative to the discussed processing nodes X, Y and Z, the layer 102-2 is the upper layer and the layer 102-4 is the under layer.

Since the layer 102-1 is the uppermost layer, it only prepares job(s) for its under layer 102-2. Similarly, since the layer 102-4 is the undermost layer, it only pulls job(s) from its upper layer 102-3.

Each processing node has an in-queue for job(s) pulled from the upper layer if any, and an out-queue for job(s) to be pulled by the under layer if any. When the amount of job(s) in the in-queue is below a first predetermined threshold or watermark, the processing node can pull job(s) from the processing nodes in the upper layer (e.g., in turns). When the amount of job(s) in the out-queue is below a second predetermined threshold or watermark, the processing node can prepare and put job(s) into the out-queue. The first and second predetermined thresholds may be set as equal to or different from each other.

To facilitate failure detection, each processing node can send a measurement report to the management node 104. The measurement report comprises information about job(s) pulled from the upper layer if any and job(s) pulled by the under layer if any.

The information about job(s) pulled from the upper layer may comprise at least identification information of the processing nodes from which the job(s) have been pulled. Optionally, it may further comprise the numbers of the job(s) pulled from the processing nodes in the upper layer respectively.

The information about job(s) pulled by the under layer may comprise at least identification information of the processing nodes that have pulled the job(s). Optionally, it may further comprise the numbers of the job(s) pulled by the processing nodes in the under layer respectively.

As an example, the processing node X may reports: the number of job(s) it has pulled from the processing node A; the number of job(s) it has pulled from the processing node B; the numbers of job(s) pulled by the processing nodes in the layer 102-4 from the processing node X respectively.

In this way, pulling mechanism is used instead of dispatching mechanism for load balance. So no central unit or dispatcher is needed in each processing layer. Because of the pulling and local job queue mechanisms, there is no processing stall in case of single point failure. That is, data processing is always continuous no matter where the failure happens. This results in that the failure detection is not a quite urgent task. Thus, the measurement report can be sent at a relatively low frequency, e.g., once per second.

The management node 104 can determine information about failure in the cloud environment 100 based on the measurement reports, which will be described in detail later. The backup management node 106 is a hot backup for the management node 104. They synchronize all the time to keep everything aligned. The plurality of layers 102-1 to 102-4, the management node 104 and the backup management node 106 may be connected with each other via a network to form a cloud computing platform.

As an example, the cloud environment 100 may be used to implement a virtual BBU pool in CloudRAN. Each of the plurality of layers may be configured to implement at least part of a corresponding protocol stack layer in a BBU. The management node 104 may be configured to implement the operation administration and maintenance (OAM) function.

Figure 2A:
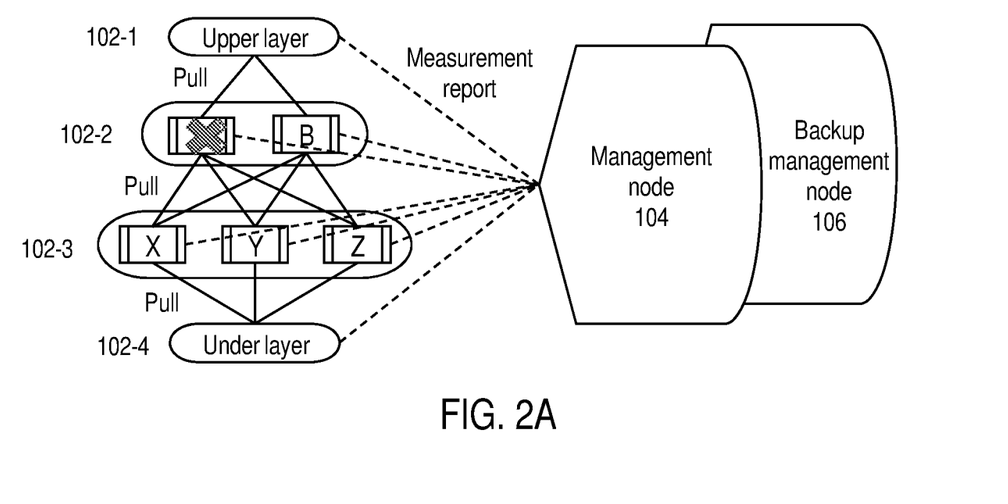
FIGS. 2A to 2F are schematic diagrams for explaining the HA detection solution according to an embodiment of the disclosure under different scenarios.

FIGS. 2A to 2F are schematic diagrams for explaining the HA detection solution according to an embodiment of the disclosure under different scenarios. FIG. 2A shows a scenario where it is assumed that the processing node A fails. In this case, the processing node A will not pull any more jobs from the layer 102-1. The processing nodes X, Y and Z cannot get any more jobs from the processing node A. They all only get jobs from the processing node B.

Correspondingly, the management node 104 may determine that the processing node A fails when the following three conditions are satisfied:
(1) the processing node A has not sent any measurement report for some time;
(2) the measurement reports from the processing nodes X, Y and Z show that they get no jobs from the processing node A for some time; and
(3) the measurement reports from the layer 102-1 show that the processing node A pulls no jobs from the layer 102-1 for some time.

Figure 2B:
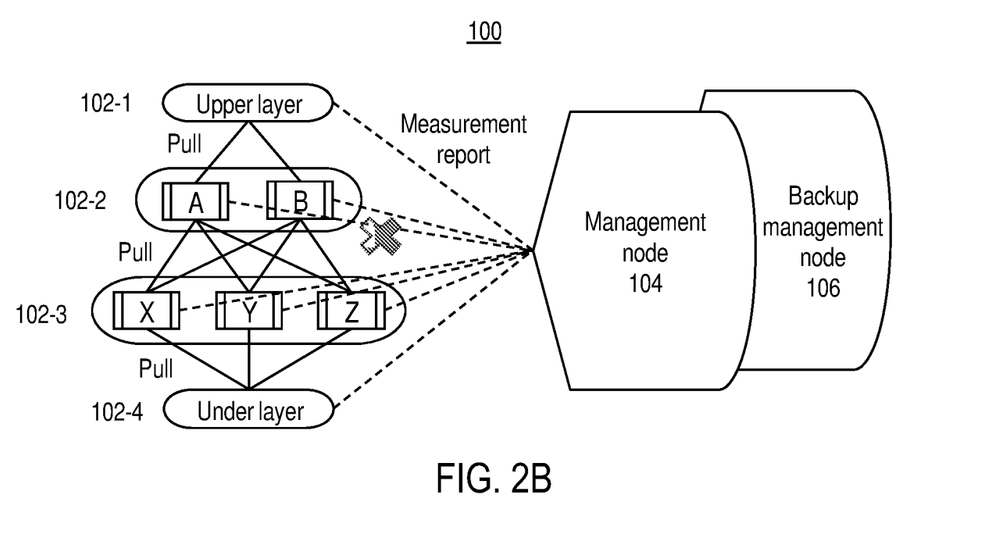

FIG. 2B shows a scenario where it is assumed that the network connection between the processing node A and the management node 104 breaks. In this case, the processing node A still pulls jobs from the layer 102-1. The processing nodes X, Y and Z still pull jobs from the processing node A. However, the management node 104 cannot receive any measurement report from the processing node A.

Correspondingly, the management node 104 may determine that the network connection between the processing node A and the management node 104 breaks when the following three conditions are satisfied:
(1) the processing node A has not sent any measurement report for some time;
(2) the measurement reports from the processing nodes X, Y and Z show that they still get jobs from the processing node A; and
(3) the measurement reports from the layer 102-1 show that the processing node A still pulls jobs from the layer 102-1.

Figure 2C:
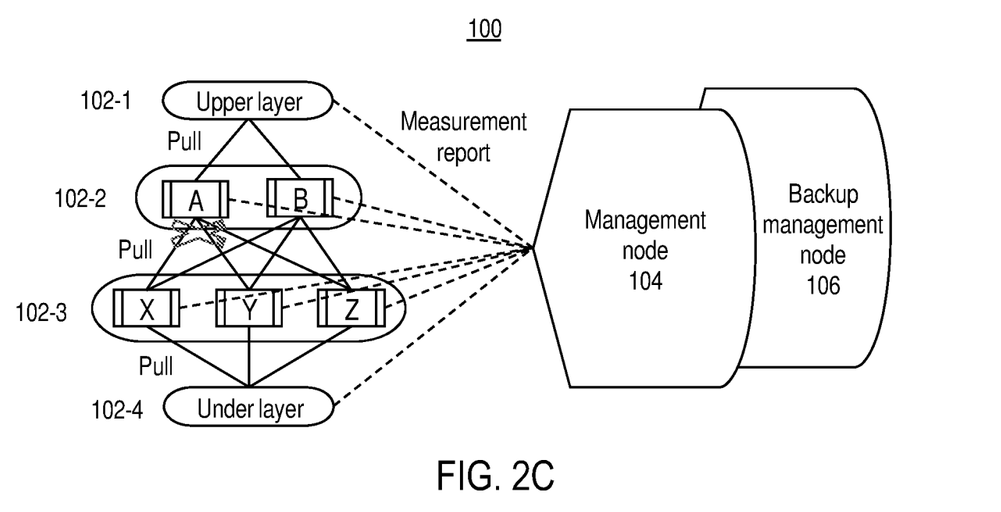

FIG. 2C shows a scenario where it is assumed that the network connection between the processing node A and its under layer 102-3 breaks. In this case, the processing node A will not pull any more jobs from the layer 102-1 because its out-queue is stuck. The processing nodes X, Y and Z cannot get any more jobs from the processing node A. They all only get jobs from the processing node B.

Correspondingly, the management node 104 may determine that the network connection between the processing node A and its under layer 102-3 breaks when the following three conditions are satisfied:
(1) the processing node A still sends a measurement report which shows that the processing node A has pulled no jobs and no jobs have been pulled from it;
(2) the measurement reports from the processing nodes X, Y and Z show that they get no jobs from the processing node A for some time; and
(3) the measurement reports from the layer 102-1 show that the processing node A pulls no jobs from the layer 102-1 for some time.

Figure 2D:
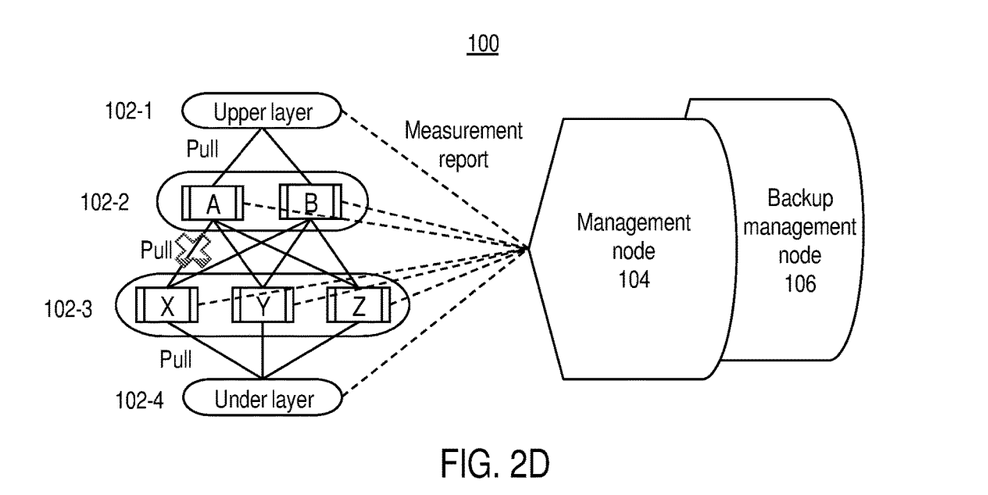

FIG. 2D shows a scenario where it is assumed that the network connection between the processing node A and the processing node X breaks. In this case, the processing node A still pulls jobs from the layer 102-1. The processing node X cannot get any more jobs from the processing node A, but can only get jobs from the processing node B. The processing nodes Y and Z still pull jobs from the processing node A.

Correspondingly, the management node 104 may determine that the network connection between the processing node A and the processing node X breaks when the following three conditions are satisfied:
(1) the processing node A still sends a measurement report which shows that no jobs have been pulled by the processing node X;
(2) the measurement report from the processing node X shows that it gets no jobs from the processing node A for some time; and
(3) the measurement reports from the layer 102-1 show that the processing node A still pulls jobs from the layer 102-1.

Figure 2E:
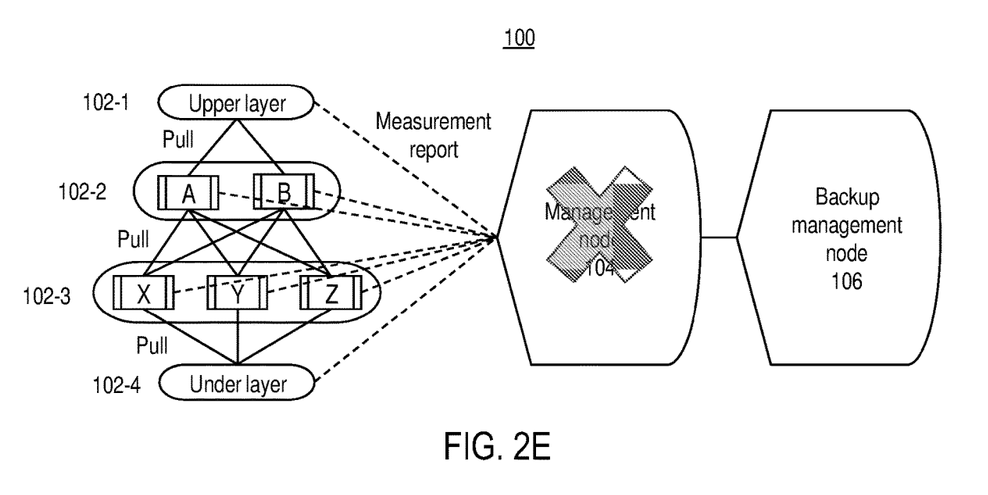

FIG. 2E shows a scenario where it is assumed that the management node 104 fails. In this case, the management node 104 will not synchronize with the backup management node 106. Correspondingly, in order to detect the failure, the backup management node 106 may check whether the management node 104 has not synchronized with the backup management node 106 for some time.

If the checking result is positive (the management node 104 has not synchronized with the backup management node 106 for some time), the backup management node 106 may start a vote to all the processing nodes in the plurality of layers 102-1 to 102-4. If they all vote that the management node 104 is dead, the backup management node 106 may determine that the management node 104 fails.

Figure 2F:
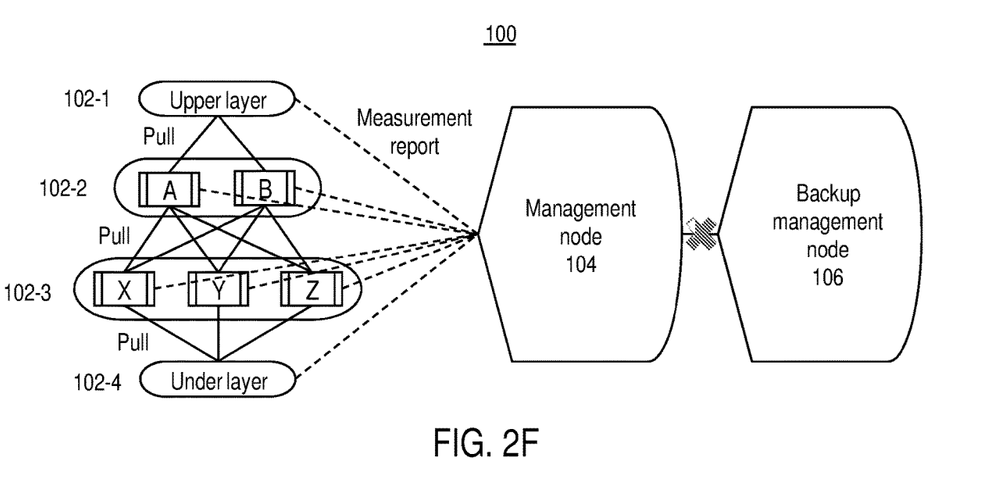

FIG. 2F shows a scenario where it is assumed that the network connection between the management node 104 and the backup management node 106 breaks. In this case, the management node 104 will not synchronize with the backup management node 106. Similar to FIG. 2E, the backup management node 106 may check whether the management node 104 has not synchronized with the backup management node 106 for some time.

If the checking result is positive (the management node 104 has not synchronized with the backup management node 106 for some time), the backup management node 106 may start a vote to all the processing nodes in the plurality of layers 102-1 to 102-4. If they all vote that the management node 104 is still working, the backup management node 106 may determine that the network connection between the management node 104 and the backup management node 106 breaks.

In this way, by means of the measurement report and vote mechanisms, the solution of the present disclosure can distinguish whether the failure is caused by working node failure or network failure. Thus, accurate failure point can be detected.

Figure 3:
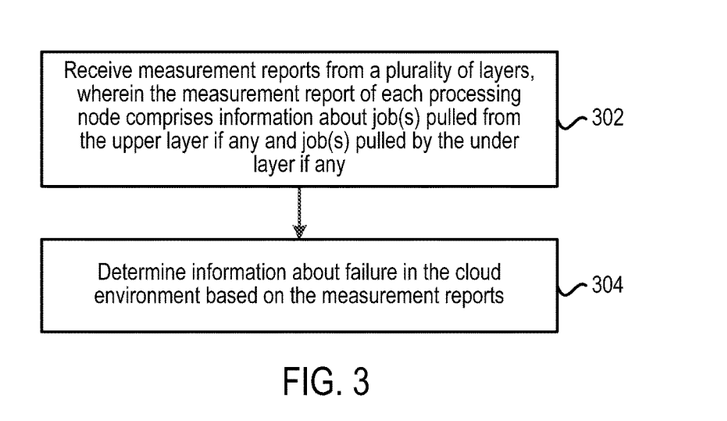
FIG. 3 depicts a flowchart of a method implemented at a management node according to an embodiment of the disclosure.

FIG. 3 depicts a flowchart of a method implemented at a management node in a cloud environment according to an embodiment of the disclosure. The cloud environment comprises a plurality of layers, and each layer includes at least two processing nodes. Each processing node in a layer can pull job(s) from the processing nodes in the upper layer if any and prepare job(s) for the processing nodes in the under layer if any.

As shown, the method comprises steps 302 and 304. At step 302, measurement reports are received from the plurality of layers. The measurement report of each processing node comprises information about job(s) pulled from the upper layer if any and job(s) pulled by the under layer if any. As described above, the information about job(s) pulled from the upper layer comprises at least identification information of the processing nodes from which the job(s) have been pulled. The information about job(s) pulled by the under layer comprises at least identification information of the processing nodes that have pulled the job(s).

As step 304, information about failure in the cloud environment is determined based on the measurement reports. As a first example, in a case where the plurality of layers comprises at least a first layer and its upper and under layers, and the first layer includes at least a first and a second processing nodes, step 304 may be implemented as steps 406 to 412 of FIG. 4.

Figure 4:
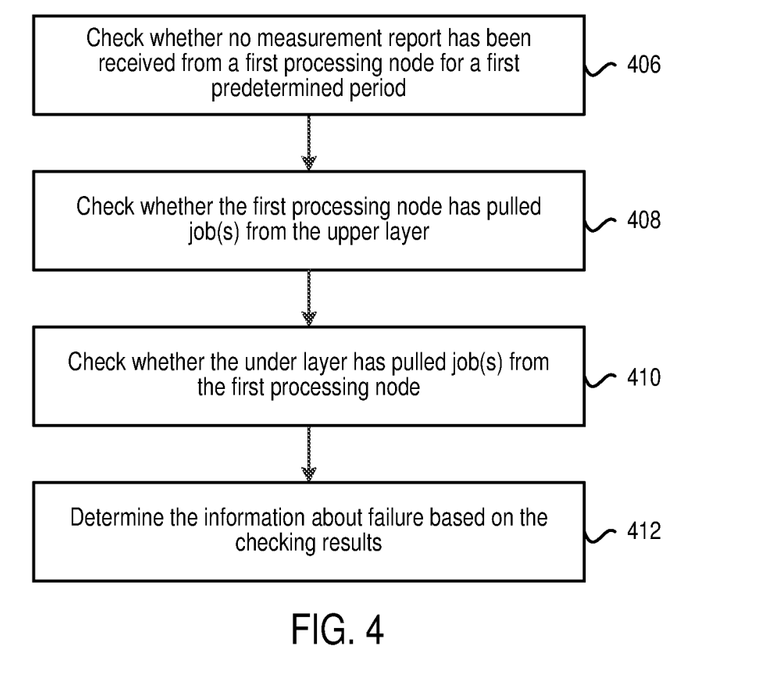
FIG. 4 depicts a flowchart for explaining the method of FIG. 3.

At step 406, it is checked whether no measurement report has been received from the first processing node for a first predetermined period. For example, the measurement report may be sent periodically. The first predetermined period may be set as equal to the period for sending the measurement report or a multiple of the period.

At step 408, it is checked whether the first processing node has pulled job(s) from the upper layer. This can be done according to the measurement reports from the first processing node and/or its upper layer.

At step 410, it is checked whether the under layer has pulled job(s) from the first processing node. This can be done according to the measurement reports from the first processing node and/or its under layer.

At step 412, the information about failure is determined based on the checking results. For example, step 412 may comprise at least one of the four steps described below.

When no measurement report has been received from the first processing node, the first processing node has pulled no jobs from the upper layer, and the under layer has pulled no jobs from the first processing node, it is determined that the first processing node fails. This corresponds to the scenario shown in FIG. 2A.

When no measurement report has been received from the first processing node, the first processing node has pulled job(s) from the upper layer, and the under layer has pulled job(s) from the first processing node, it is determined that the connection between the first processing node and the management node breaks. This corresponds to the scenario shown in FIG. 2B.

When a measurement report has been received from the first processing node, the first processing node has pulled no jobs from the upper layer, and the under layer has pulled no jobs from the first processing node, it is determined that the connection between the first processing node and the under layer breaks. This corresponds to the scenario shown in FIG. 2C.

When a measurement report has been received from the first processing node, the first processing node has pulled job(s) from the upper layer, and only a third processing node in the under layer has pulled no jobs from the first processing node, it is determined that the connection between the first and third processing nodes breaks. This corresponds to the scenario shown in FIG. 2D.

Figure 5:
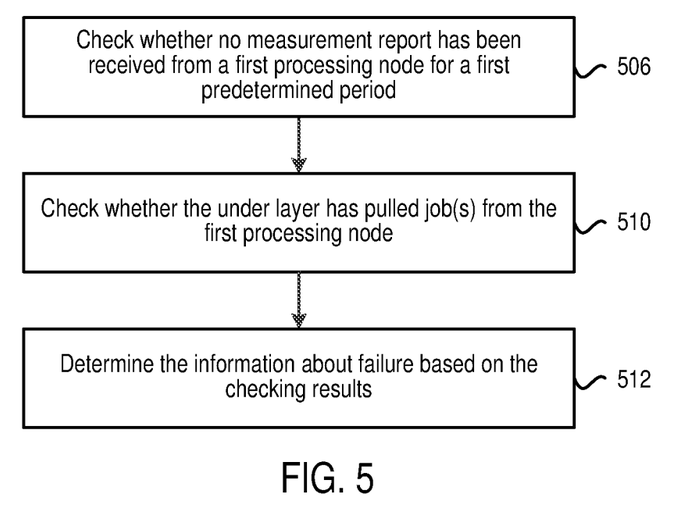
FIG. 5 depicts another flowchart for explaining the method of FIG. 3.

As a second example, in a case where the plurality of layers comprises at least a first layer and its under layer, and the first layer is the uppermost layer including at least a first and a second processing nodes, step 304 may be implemented as steps 506, 510 and 512 of FIG. 5. This example is similar to the first example except that there is no upper layer for the first processing node.

At step 506, it is checked whether no measurement report has been received from the first processing node for a first predetermined period. This step is similar to step 406.

At step 510, it is checked whether the under layer has pulled job(s) from the first processing node. This step is similar to step 410.

At step 512, the information about failure is determined based on the checking results. For example, this step may comprise at least one of the four steps described below.

When no measurement report has been received from the first processing node, and the under layer has pulled no jobs from the first processing node, it is determined that the first processing node fails. This is similar to the scenario shown in FIG. 2A.

When no measurement report has been received from the first processing node, and the under layer has pulled job(s) from the first processing node, it is determined that the connection between the first processing node and the management node breaks. This is similar to the scenario shown in FIG. 2B.

When a measurement report has been received from the first processing node, and the under layer has pulled no jobs from the first processing node, it is determined that the connection between the first processing node and the under layer breaks. This is similar to the scenario shown in FIG. 2C.

When a measurement report has been received from the first processing node, and only a third processing node in the under layer has pulled no jobs from the first processing node, it is determined that the connection between the first and third processing nodes breaks. This is similar to the scenario shown in FIG. 2D.

Figure 6:
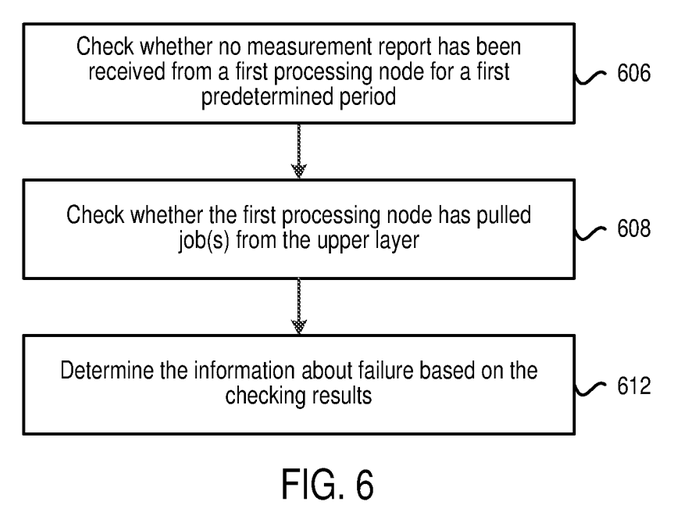
FIG. 6 depicts another flowchart for explaining the method of FIG. 3.

As a third example, in a case where the plurality of layers comprises at least a first layer and its upper layer, and the first layer is the undermost layer including at least a first and a second processing nodes, step 304 may be implemented as steps 606, 608 and 612 of FIG. 6.

At step 606, it is checked whether no measurement report has been received from the first processing node for a first predetermined period. This step is similar to step 406.

At step 608, it is checked whether the first processing node has pulled job(s) from the upper layer. This step is similar to step 408.

At step 612, the information about failure is determined based on the checking results. For example, this step may comprise at least one of the four steps described below.

When no measurement report has been received from the first processing node, and the first processing node has pulled no jobs from the upper layer, it is determined that the first processing node fails. This is similar to the scenario shown in FIG. 2A.

When no measurement report has been received from the first processing node, and the first processing node has pulled job(s) from the upper layer, it is determined that the connection between the first processing node and the management node breaks. This is similar to the scenario shown in FIG. 2B.

When a measurement report has been received from the first processing node, and the first processing node has pulled no jobs from the upper layer, it is determined that the connection between the first processing node and the upper layer breaks. This is similar to the scenario shown in FIG. 2C.

When a measurement report has been received from the first processing node, and the first processing node has pulled no jobs from only a third processing node in the upper layer, it is determined that the connection between the first and third processing nodes breaks. This is similar to the scenario shown in FIG. 2D.

Figure 7:
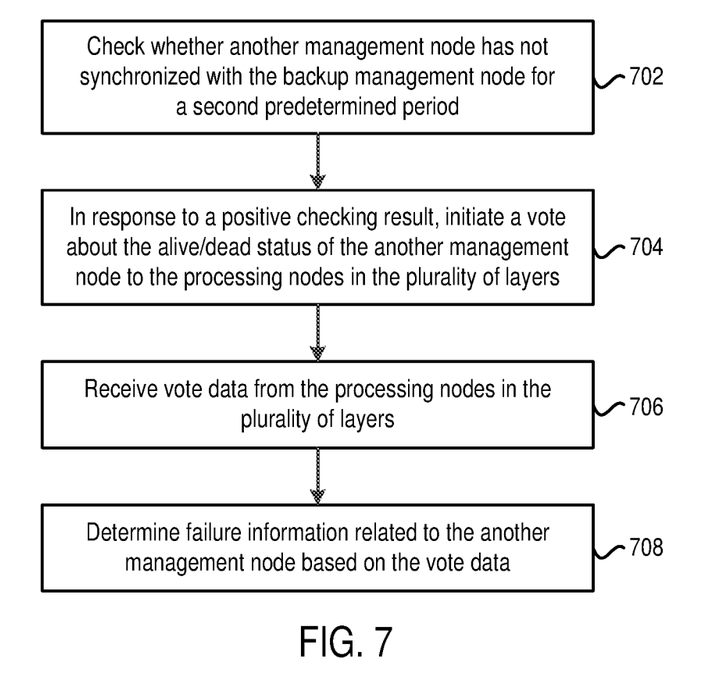
FIG. 7 depicts a flowchart of a method implemented at a backup management node according to an embodiment of the disclosure.

FIG. 7 depicts a flowchart of a method implemented at a backup management node according to an embodiment of the disclosure. The backup management node may act as a hot backup for another management node. At step 702, it is checked whether the another management node has not synchronized with the backup management node for a second predetermined period. The second predetermined period may be set as equal to or different from the first predetermined period.

In response to a positive checking result (the another management node has not synchronized with the backup management node for the second predetermined period), a vote about the alive/dead status of the another management node is initiated to the processing nodes in the plurality of layers at step 704.

At step 706, vote data is received from the processing nodes in the plurality of layers. The vote data may indicates the alive/dead status of the another management node. For example, after a processing node has sent a measurement report to the another management node, if no acknowledgement is received from it, the processing node may determine it as dead. Otherwise, the processing node may determine it as alive.

At step 708, failure information related to the another management node is determined based on the vote data. For example, this step may comprise at least one of the two steps described below.

When all the processing nodes vote that the another management node is dead, it is determined that the another management node fails. On the other hand, when all the processing nodes vote that the another management node is alive, it is determined that the connection between the another management node and the backup management node breaks.

Correspondingly, the present disclosure also provides a method implemented at a processing node in a cloud environment. The cloud environment comprises a plurality of layers, and each layer includes at least two processing nodes. Each processing node in a layer can pull job(s) from the processing nodes in the upper layer if any and prepare job(s) for the processing nodes in the under layer if any.

The method comprises a step of sending a measurement report to a management node for failure detection. The measurement report comprises information about job(s) pulled from the upper layer if any and job(s) pulled by the under layer if any.

Figure 8:
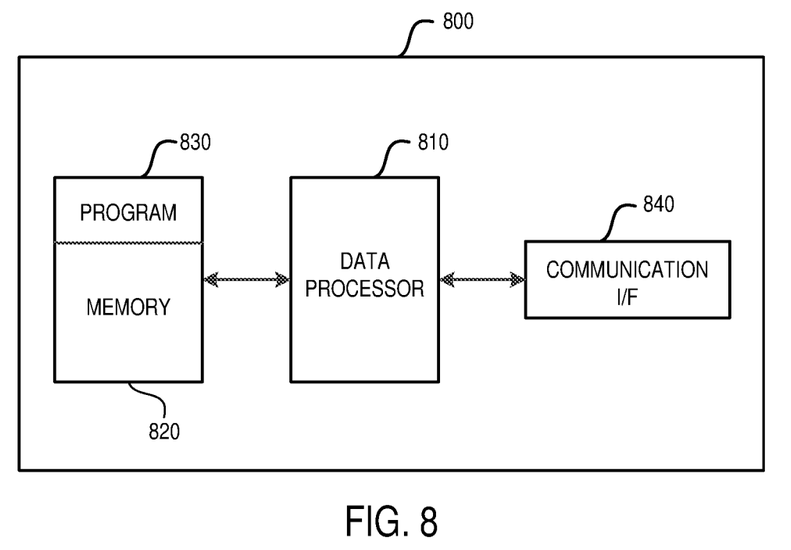
FIG. 8 is a simplified block diagram showing an apparatus that is suitable for use in practicing some embodiments of the disclosure.

FIG. 8 is a simplified block diagram showing an apparatus that is suitable for use in practicing some embodiments of the disclosure. For example, any one of the processing node, the management node and the backup management node may be implemented through the apparatus 800. As shown, the apparatus 800 may include a data processor 810, a memory 820 that stores a program 830, and a communication interface 840 for communicating data with other external devices through wired communication.

The program 830 is assumed to include program instructions that, when executed by the data processor 810, enable the apparatus 800 to operate in accordance with the embodiments of this disclosure, as discussed above. That is, the embodiments of this disclosure may be implemented at least in part by computer software executable by the data processor 810, or by hardware, or by a combination of software and hardware.

The memory 820 may be of any type suitable to the local technical environment and may be implemented using any suitable data storage technology, such as semiconductor based memory devices, flash memory, magnetic memory devices and systems, optical memory devices and systems, fixed memory and removable memory. The data processor 810 may be of any type suitable to the local technical environment, and may include one or more of general purpose computers, special purpose computers, microprocessors, digital signal processors (DSPs) and processors based on multi-core processor architectures, as non-limiting examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

The flowchart and block diagrams in the figures illustrate the architecture, functionality, and operation of possible implementations of apparatuses, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method, comprising:
    receiving measurement reports at a management node in a cloud environment comprising a plurality of layers, each layer of the plurality of layers comprising at least two processing nodes, each processing node in a layer of the plurality of layers operable to pull jobs from the processing nodes in an upper layer of the plurality of layers and prepare jobs for the processing nodes in an under layer of the plurality of layers, wherein the measurement report of said each processing node comprises information about any jobs pulled from the upper layer and any jobs pulled by the under layer; and
    determining information about failure in the cloud environment based on the measurement reports.

2. The method according to claim 1, wherein the information about jobs pulled from the upper layer comprises at least identification information of the processing nodes from which the jobs have been pulled; and
    wherein the information about jobs pulled by the under layer comprises at least identification information of the processing nodes that have pulled the jobs.

3. The method according to claim 1, wherein the plurality of layers comprises at least a first layer and its upper and under layers, and the first layer includes at least a first and a second processing nodes; wherein determining the information about failure comprises:
    checking whether no measurement report has been received from the first processing node for a first predetermined period;
    checking whether the first processing node has pulled jobs from the upper layer;
    checking whether the under layer has pulled jobs from the first processing node; and
    determining the information about failure based on the checking results.

4. The method according to claim 3, wherein determining the information about failure comprises:
    when no measurement report has been received from the first processing node, the first processing node has pulled no jobs from the upper layer, and the under layer has pulled no jobs from the first processing node, determining that the first processing node fails;
    when no measurement report has been received from the first processing node, the first processing node has pulled jobs from the upper layer, and the under layer has pulled jobs from the first processing node, determining that the connection between the first processing node and the management node breaks;
    when a measurement report has been received from the first processing node, the first processing node has pulled no jobs from the upper layer, and the under layer has pulled no jobs from the first processing node, determining that the connection between the first processing node and the under layer breaks; and
    when a measurement report has been received from the first processing node, the first processing node has pulled jobs from the upper layer, and only a third processing node in the under layer has pulled no jobs from the first processing node, determining that the connection between the first and third processing nodes breaks.

5. The method according to claim 1, wherein the plurality of layers comprises at least a first layer and its under layer, and the first layer is the uppermost layer including at least a first and a second processing nodes; wherein determining the information about failure comprises:
    checking whether no measurement report has been received from the first processing node for a first predetermined period;
    checking whether the under layer has pulled jobs from the first processing node; and
    determining the information about failure based on the checking results.

6. The method according to claim 5, wherein determining the information about failure comprises:
    when no measurement report has been received from the first processing node, and the under layer has pulled no jobs from the first processing node, determining that the first processing node fails;
    when no measurement report has been received from the first processing node, and the under layer has pulled jobs from the first processing node, determining that the connection between the first processing node and the management node breaks;
    when a measurement report has been received from the first processing node, and the under layer has pulled no jobs from the first processing node, determining that the connection between the first processing node and the under layer breaks; and
    when a measurement report has been received from the first processing node, and only a third processing node in the under layer has pulled no jobs from the first processing node, determining that the connection between the first and third processing nodes breaks.

7. The method according to claim 1, wherein the plurality of layers comprises at least a first layer and its upper layer, and the first layer is the undermost layer including at least a first and a second processing nodes; and wherein determining the information about failure comprises:

checking whether no measurement report has been received from the first processing node for a first predetermined period;

checking whether the first processing node has pulled jobs from the upper layer; and determining the information about failure based on the checking results.

8. The method according to claim 7, wherein determining the information about failure comprises:

when no measurement report has been received from the first processing node, and the first processing node has pulled no jobs from the upper layer, determining that the first processing node fails;

when no measurement report has been received from the first processing node, and the first processing node has pulled jobs from the upper layer, determining that the connection between the first processing node and the management node breaks;

when a measurement report has been received from the first processing node, and the first processing node has pulled no jobs from the upper layer, determining that the connection between the first processing node and the upper layer breaks; and when a measurement report has been received from the first processing node, and the first processing node has pulled no jobs from only a third processing node in the upper layer, determining that the connection between the first and third processing nodes breaks.

9. The method according to claim 1, wherein the management node can be configured to act as a backup management node for another management node; and wherein the method further comprises:

checking whether the another management node has not synchronized with the backup management node for a second predetermined period;

in response to a positive checking result, initiating a vote about the alive/dead status of the another management node to the processing nodes in the plurality of layers;

receiving vote data from the processing nodes in the plurality of layers; and determining failure information related to the another management node based on the vote data.

10. The method according to claim 9, wherein determining the failure information related to the another management node comprises:

when all the processing nodes vote that the another management node is dead, determining that the another management node fails; and when all the processing nodes vote that the another management node is alive, determining that the connection between the another management node and the backup management node breaks.

11. A management node for use in a cloud environment, wherein the cloud environment comprises a plurality of layers, each layer of the plurality of layers includes at least two processing nodes, and each processing node in a layer of the plurality of layers is operable to pull jobs from the processing nodes in the upper layer of the plurality of layers and prepare jobs for the processing nodes in the under layer of the plurality of layers, the management node comprising:

at least one processor; and at least one memory including computer-executable code, wherein the at least one memory and the computer-executable code are configured to, with the at least one processor, cause the management node to:

receive measurement reports from the plurality of layers, wherein the measurement report of said each processing node comprises information about any jobs pulled from the upper layer and any jobs pulled by the under layer; and determine information about failure in the cloud environment based on the measurement reports.

12. The management node according to claim 11, wherein the plurality of layers comprises at least a first layer and its upper and under layers, and the first layer includes at least a first and a second processing nodes; and wherein the management node is caused to determine the information about failure by:

checking whether no measurement report has been received from the first processing node for a first predetermined period;

checking whether the first processing node has pulled any jobs from the upper layer;

checking whether the under layer has pulled any jobs from the first processing node; and determining the information about failure based on the checking results.

13. The management node according to claim 12, wherein the management node is caused to determine the information about failure by:

when no measurement report has been received from the first processing node, the first processing node has pulled no jobs from the upper layer, and the under layer has pulled no jobs from the first processing node, determining that the first processing node fails;

when no measurement report has been received from the first processing node, the first processing node has pulled jobs from the upper layer, and the under layer has pulled jobs from the first processing node, determining that the connection between the first processing node and the management node breaks;

when a measurement report has been received from the first processing node, the first processing node has pulled no jobs from the upper layer, and the under layer has pulled no jobs from the first processing node, determining that the connection between the first processing node and the under layer breaks; and when a measurement report has been received from the first processing node, the first processing node has pulled jobs from the upper layer, and only a third processing node in the under layer has pulled no jobs from the first processing node, determining that the connection between the first and third processing nodes breaks.

14. The management node according to claim 11, wherein the plurality of layers comprises at least a first layer and its under layer, and the first layer is the uppermost layer including at least a first and a second processing nodes; and wherein the management node is caused to determine the information about failure by:

checking whether no measurement report has been received from the first processing node for a first predetermined period;

checking whether the under layer has pulled any jobs from the first processing node; and determining the information about failure based on the checking results.

15. The management node according to claim 14, wherein the management node is caused to determine the information about failure by:
when no measurement report has been received from the first processing node, and the under layer has pulled no jobs from the first processing node, determining that the first processing node fails;
when no measurement report has been received from the first processing node, and the under layer has pulled jobs from the first processing node, determining that the connection between the first processing node and the management node breaks;
when a measurement report has been received from the first processing node, and the under layer has pulled no jobs from the first processing node, determining that the connection between the first processing node and the under layer breaks; and
when a measurement report has been received from the first processing node, and only a third processing node in the under layer has pulled no jobs from the first processing node, determining that the connection between the first and third processing nodes breaks.

16. The management node according to claim 11, wherein the plurality of layers comprises at least a first layer and its upper layer, and the first layer is the undermost layer including at least a first and a second processing nodes; and
wherein the management node is caused to determine the information about failure by:
checking whether no measurement report has been received from the first processing node for a first predetermined period;
checking whether the first processing node has pulled jobs from the upper layer; and
determining the information about failure based on the checking results.

17. The management node according to claim 16, wherein the management node is caused to determine the information about failure by:
when no measurement report has been received from the first processing node, and the first processing node has pulled no jobs from the upper layer, determining that the first processing node fails;
when no measurement report has been received from the first processing node, and the first processing node has pulled jobs from the upper layer, determining that the connection between the first processing node and the management node breaks;
when a measurement report has been received from the first processing node, and the first processing node has pulled no jobs from the upper layer, determining that the connection between the first processing node and the upper layer breaks; and
when a measurement report has been received from the first processing node, and the first processing node has pulled no jobs from only a third processing node in the upper layer, determining that the connection between the first and third processing nodes breaks.

18. The management node according to 11, wherein the management node can be configured to act as a backup management node for another management node; and
wherein the management node is further caused to:
check whether the another management node has not synchronized with the backup management node for a second predetermined period;
in response to a positive checking result, initiate a vote about the alive/dead status of the another management node to the processing nodes in the plurality of layers;
receive vote data from the processing nodes in the plurality of layers; and
determine failure information related to the another management node based on the vote data.

19. The management node according to claim 18, wherein the management node is caused to determine the failure information related to the another management node by:
when all the processing nodes vote that the another management node is dead, determining that the another management node fails; and
when all the processing nodes vote that the another management node is alive, determining that the connection between the another management node and the backup management node breaks.

20. A non-transitory computer readable storage medium having computer-executable program instructions stored therein, the computer-executable program instructions being configured to, when being executed, cause an apparatus to:
receive measurement reports at a management node in a cloud environment comprising a plurality of layers, each layer of the plurality of layers comprising at least two processing nodes, each processing node in a layer operable to pull jobs from the processing nodes in an upper layer of the plurality of layers and prepare jobs for the processing nodes in an under layer of the plurality of layers, wherein the measurement report of said each processing node comprises information about any jobs pulled from an-the upper layer and any jobs pulled by an-the under layer; and
determine information about failure in the cloud environment based on the measurement reports.

* * * * *